(12) United States Patent
Shimizu

(10) Patent No.: US 7,800,787 B2
(45) Date of Patent: Sep. 21, 2010

(54) IMAGE READING APPARATUS

(75) Inventor: Mitsuo Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1677 days.

(21) Appl. No.: 10/933,408

(22) Filed: Sep. 3, 2004

(65) Prior Publication Data

US 2005/0146756 A1 Jul. 7, 2005

(30) Foreign Application Priority Data

Jan. 6, 2004 (JP) .............................. 2004-000989

(51) Int. Cl.
*H04N 1/04* (2006.01)
(52) U.S. Cl. .................. 358/474; 358/483; 358/501; 358/509; 348/E5.027; 348/E5.081; 250/208.1; 382/312
(58) Field of Classification Search ............. 358/482, 358/474, 471, 400, 466, 465, 448, 443, 501, 358/401, 483, 475, 509, 518; 257/239, 215, 257/213, 292, 435, 230; 382/312, 321; 348/296, 348/297, 29, 311, 222.1; 250/208.1, 208.4, 250/214.1
See application file for complete search history.

(56) References Cited

U.S. PATENT DOCUMENTS

| | | | | | |
|---|---|---|---|---|---|
| 4,242,700 | A | * | 12/1980 | Weimer | 348/275 |
| 4,679,090 | A | * | 7/1987 | Erhardt | 348/324 |
| 5,070,414 | A | * | 12/1991 | Tsutsumi | 358/466 |
| 5,218,457 | A | * | 6/1993 | Burkhardt et al. | 358/448 |
| 5,986,702 | A | * | 11/1999 | Maki | 348/241 |
| 6,005,617 | A | * | 12/1999 | Shimamoto et al. | 348/295 |
| 6,153,874 | A | * | 11/2000 | Monoi | 250/208.1 |
| 6,281,991 | B1 | * | 8/2001 | Mori et al. | 358/475 |
| 6,323,901 | B1 | * | 11/2001 | Ukita | 348/273 |
| 6,452,634 | B1 | * | 9/2002 | Ishigami et al. | 348/322 |
| 6,498,621 | B1 | * | 12/2002 | Ikeda et al. | 348/222.1 |
| 6,507,365 | B1 | * | 1/2003 | Nakamura et al. | 348/296 |
| 6,534,757 | B2 | * | 3/2003 | Inui et al. | 250/208.1 |
| 7,027,096 | B2 | * | 4/2006 | Miyashita et al. | 348/372 |
| 7,030,358 | B2 | * | 4/2006 | Misawa | 250/208.1 |
| 7,355,760 | B2 | * | 4/2008 | Yoshihara et al. | 358/474 |
| 2001/0028401 | A1 | * | 10/2001 | Miyashita et al. | 348/311 |
| 2002/0070331 | A1 | * | 6/2002 | Inui et al. | 250/208.1 |
| 2002/0118291 | A1 | * | 8/2002 | Ishigami et al. | 348/311 |

(Continued)

FOREIGN PATENT DOCUMENTS

CN 1233784 11/1999

(Continued)

*Primary Examiner*—Negussie Worku
(74) *Attorney, Agent, or Firm*—Oliff & Berridge, PLC

(57) ABSTRACT

An image reading apparatus includes a solid-state image sensor having a pixel array section in which pixels each including a photoelectric transducer are arrayed, a charge transfer register that transfers a signal charge transferred from each of the pixels of the pixel array section, and an output section that converts the signal charge transferred by the charge transfer register into an electrical signal and outputs the electrical signal; a driving unit that drives the charge transfer register according to a first timing signal, and the output section according to a second timing signal; and a power supplying unit that supplies power of different power systems to a circuit portion handling the first timing signal and a circuit portion handling the second timing signal of the driving unit.

14 Claims, 5 Drawing Sheets

U.S. PATENT DOCUMENTS

| | | | |
|---|---|---|---|
| 2003/0020821 A1* | 1/2003 | Watanabe et al. | 348/312 |
| 2004/0223193 A1* | 11/2004 | Sawada | 358/483 |
| 2010/0013969 A1* | 1/2010 | Ui | 348/294 |

FOREIGN PATENT DOCUMENTS

| | | |
|---|---|---|
| CN | 1400808 | 3/2003 |
| JP | A-4-326853 | 11/1992 |
| JP | A-5-90547 | 4/1993 |
| JP | A-5-103272 | 4/1993 |
| JP | A-7-46371 | 2/1995 |
| JP | A-7-46374 | 2/1995 |
| JP | A-7-87400 | 3/1995 |
| JP | A-7-99609 | 4/1995 |
| JP | A-8-340419 | 12/1996 |
| JP | A-10-23208 | 1/1998 |
| JP | A-10-200688 | 7/1998 |
| JP | A-11-88774 | 3/1999 |
| JP | A 11-225252 | 8/1999 |
| JP | A-11-225252 | 8/1999 |
| JP | A 2001-28672 | 1/2001 |
| JP | A 2002-271570 | 9/2002 |

* cited by examiner

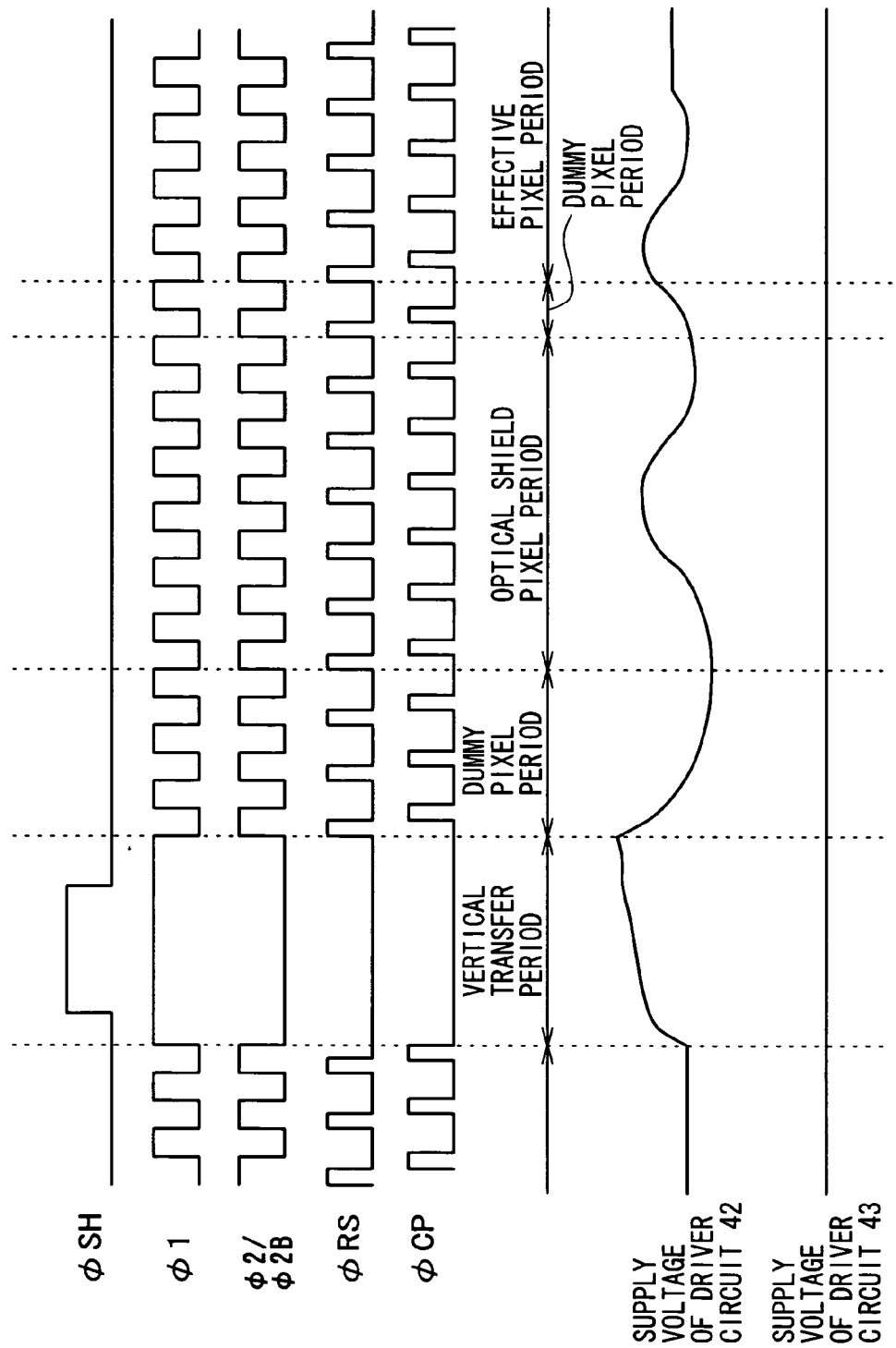
F I G. 5

IMAGE READING APPARATUS

BACKGROUND OF THE INVENTION

1. Field of the Invention

The present invention relates to an image reading apparatus, and more particularly to an image reading apparatus of an image processing apparatus having, for example, a function of reading document images, such as a scanner, a copier, a facsimile, or a multi-function device having their functions.

2. Description of the Related Art

In an image reading apparatus of an image processing apparatus having, for example, a function of reading document images, such as a scanner, a copier, a facsimile, or a multi-function device having their functions, for example, a solid-state image sensor represented by a CCD (Charge Coupled Device) type image sensor (hereinafter referred to as a CCD sensor) is used as a unit that optically reads document images.

A CCD sensor used by an image reading apparatus generally has a configuration of a so-called line sensor including: a pixel array section in which a large number of pixels each including a photoelectric transducer are linearly arrayed; a CCD register that sequentially horizontally transfers signal charges vertically transferred (shifted) from the individual pixels of the pixel array section; and an output amplifier including a charge-to-voltage conversion section that converts the signal charges sequentially transferred by the CCD register into voltages and outputs the voltages.

To drive the CCD sensor, a main clock (horizontal transfer clock) for driving the CCD register and a last stage pulse (reset pulse, etc.) for driving the output amplifier are used. The main clock is supplied to the CCD register only in a horizontal transfer period in which signal charges are sequentially transferred by the CCD register, and the supply of the main clock to the CCD register is halted during a vertical transfer period in which signal charges are vertically transferred from the individual pixels of the pixel array section to the CCD register. The operations of supply and halt of the main clock for the CCD register are repeated every one-line cycle (one fast-scanning period).

As a result of the supply and halt of the main clock being repeated, a large load current flows through the driver circuit for the main clock in the horizontal scanning period, while few currents flow in the vertical transfer period. As a result, when the vertical transfer period ends and the horizontal transfer starts, a large fluctuation of current consumption occurs in the driver circuit. The fluctuation of current consumption is accompanied by fluctuations of a supply voltage of the driver circuit, which in turn causes fluctuation of voltage amplitudes and the like of the main clock itself.

As a result, a level fluctuation corresponding to fluctuations of a supply voltage of the driver circuit occurs in an output signal of the CCD sensor. Consequently, a black level (reference level of output signal) obtained in a leading portion of one line fluctuates, and the influence of the fluctuation remains in pixel signals of an optical shield pixel portion and pixel signals of an effective pixel portion. As a result, an image signal of normal level cannot be obtained as an output signal of the CCD sensor, with the result that highly accurate reading operations cannot be performed.

Recently, the frequency of a drive signal is set high to increase a reading speed, or the number of pixels of the pixel array section of the CCD sensor is increased to increase read resolution. Thus, as the frequency of the drive signal becomes higher and the number of pixels of the pixel array section of the CCD sensor increases, a load current of the driver circuit for the main clock tends to increase because an input load capacity of the CCD sensor increases. Therefore, level fluctuations of output signals of the CCD sensor become greater which correspond to power supply fluctuations of the driver circuit caused by the repeated supply and halt of the main clock.

SUMMARY OF THE INVENTION

The present invention has been made in view of the above circumstances and provides an image reading apparatus that can always obtain read signals of stable levels without being influenced by fluctuations of a supply voltage due to load fluctuations of a clock driver.

An image reading apparatus according to an aspect of the present invention includes: a solid-state image sensor having a pixel array section in which pixels each including a photoelectric transducer are arrayed, a charge transfer register that transfers a signal charge transferred from each of the pixels of the pixel array section, and an output section that converts the signal charge transferred by the charge transfer register into an electrical signal and outputs the electrical signal; a driving unit that drives the charge transfer register according to a first timing signal, and the output section according to a second timing signal; and a power supplying unit that supplies power of different power systems to a circuit portion handling the first timing signal and a circuit portion handling the second timing signal of the driving unit.

BRIEF DESCRIPTION OF THE DRAWINGS

Embodiments of the present invention will be described in detail based on the followings, wherein:

FIG. 5 is a timing chart showing a timing relationship of shift pulse $\phi$SH, horizontal transfer clocks $\phi$1 and $\phi$2/$\phi$2B, and reset gate pulse $\phi$RG, and clamp pulse $\phi$CP, and waveforms of a supply voltage of a driver circuit.

DETAILED DESCRIPTION OF THE INVENTION

Hereinafter, embodiments of the present invention will be described in detail with reference to the accompanying drawings.

Figure 1:
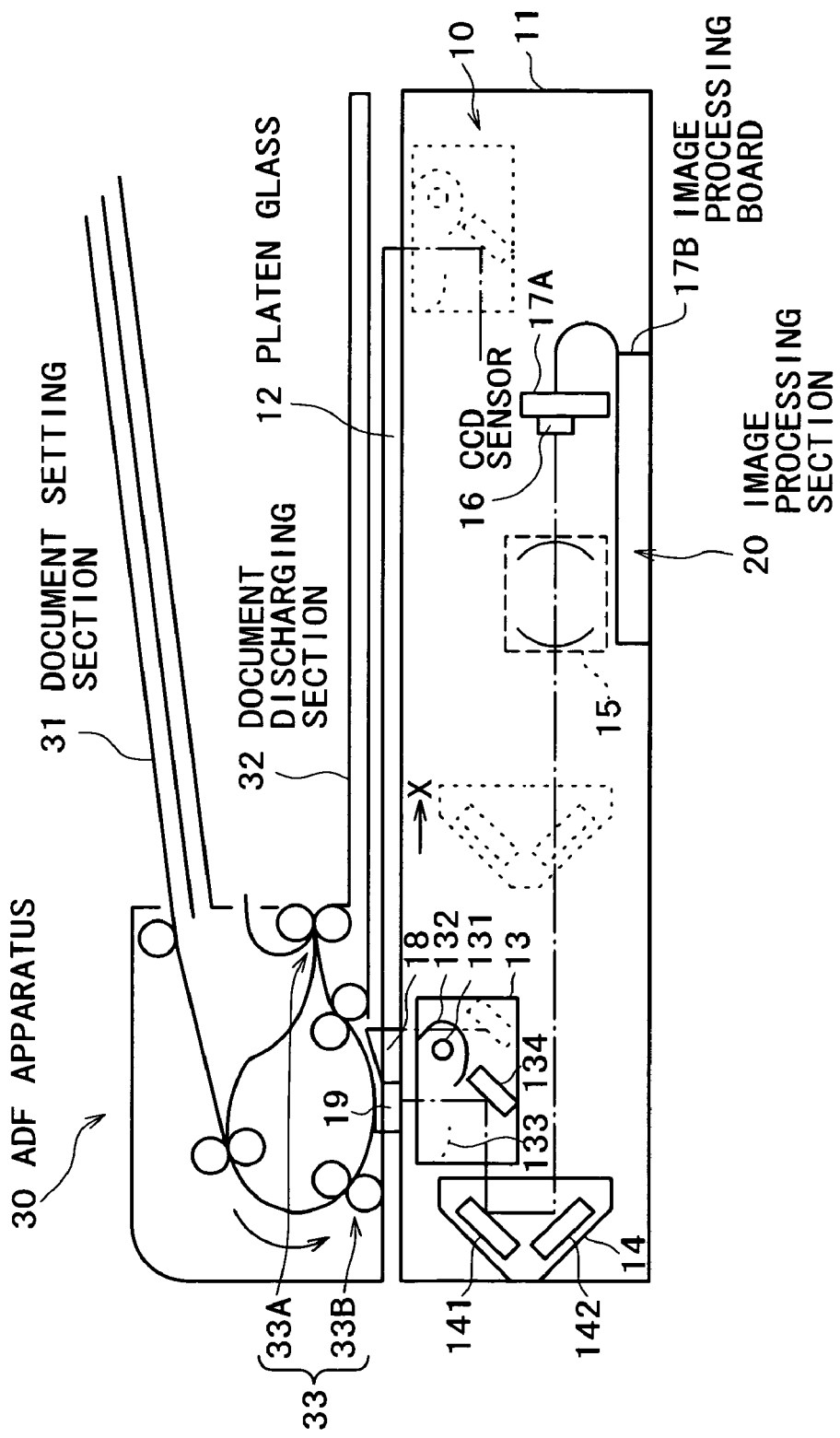
FIG. 1 is a side sectional view schematically showing the configuration of an image reading apparatus to which the present invention is applied.

FIG. 1 is a side sectional view showing the outline of the configuration of an image reading apparatus to which the present invention is applied. As shown in FIG. 1, an image reading apparatus of this example includes a document reading section 10, an image processing section 20, and an ADF (Automatic Document Feeder) apparatus 30 functioning as a platen cover as well and not having a circulation function. This image reading apparatus is used as an image reading apparatus of an image processing apparatus having, for example, at least a function of reading document images, such as a scanner, a copier, a facsimile, or a multi-function device having their functions.

The document reading section 10 includes a housing 11, a platen glass (document mounting stand) 12, a full rate carriage 13, a half rate carriage 14, a lens 15, and a CCD sensor 16. The platen glass 12 is formed of transparent glass disposed on the housing 11. A sheet-type document to be read is mounted on the platen glass 12.

The full rate carriage 13, disposed below the platen glass 12 within the housing 11, includes: a light source 131 that applies light toward a face opposite to a document mounting face of the platen glass 12; a substantially concave reflector 132 and a reflection mirror 133 that reflect light emitted from the light source 131 to the platen glass 12; a reflection mirror 134 that changes an optical path of reflected light from the platen glass 12 in a direction substantially parallel to the platen glass 12. As the light source 131, a fluorescent lamp with a longitudinal direction as a fast-scanning direction (a direction orthogonal to paper surface) is used.

The half rate carriage 14 includes two reflection mirrors 141 and 142 disposed to form substantially a right angle, and successively changes optical paths of reflected light passing through the full rate carriage 13 by 90 degrees at a time. The full rate carriage 13 and the half rate carriage 14, driven by e.g., a stepping motor (not shown in the drawing), are configured to reciprocally travel in a slow-scanning direction (a direction indicated by the arrow X in the drawing) and a direction opposite to it in conjunction with each other.

The lens 15 gathers reflected light inputted from the platen glass 12 via the full rate carriage 13 and the half rate carriage 14 onto an imaging face of the CCD sensor 16, which is a solid-state image sensor. By receiving the reflected light gathered by the lens 15, the CCD sensor 16 senses the image of a document mounted on the platen glass 12 in the fast-scanning direction and successively outputs analog image signals corresponding to the density of the image (corresponding to the intensity of the reflected light).

Figure 2:
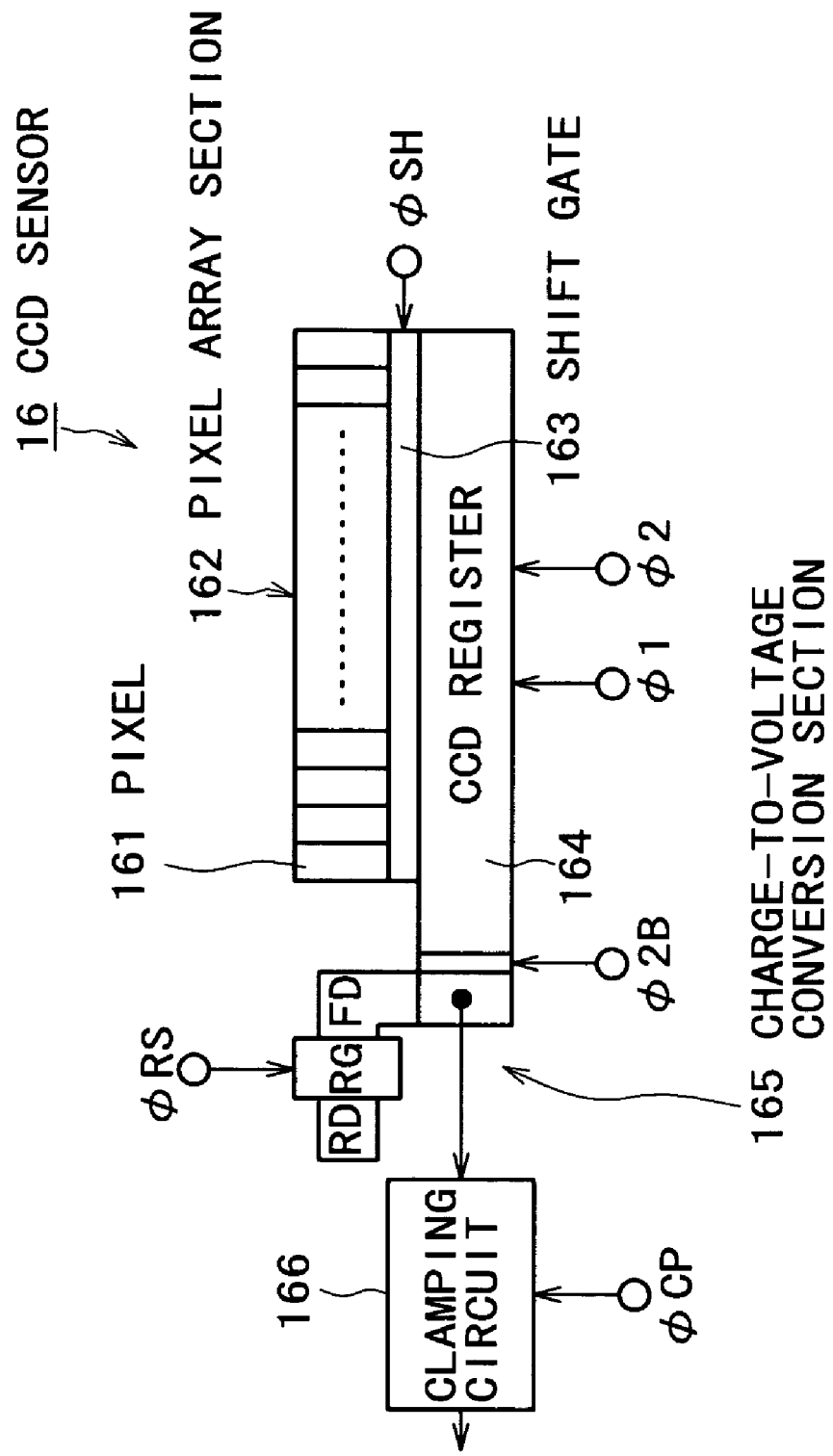
FIG. 2 is a plan view schematically showing the configuration of a CCD sensor.

FIG. 2 is a plan view schematically showing the configuration of the CCD sensor 16.

As shown in FIG. 2, the CCD sensor 16 has a configuration of a line sensor (linear sensor) including: a pixel array section 162 in which a large number of pixels 161 each including a photoelectric transducer such as a photodiode are linearly arrayed; a shift gate 163 that vertically transfers (shifts) a signal charge obtained corresponding to the product of the intensity of incident light and time, that is, an exposure in each pixel 161 of the pixel array section 162; a CCD charge transfer register 164 (hereinafter referred to as a CCD register) that sequentially horizontally transfers the vertically transferred signal charges; a charge-to-voltage conversion section 165 that converts the signal charges sequentially transferred by the CCD register 164 into voltages (electrical signals) and outputs the voltages; and a clamping circuit 166 disposed in a stage subsequent to the charge-to-voltage conversion section 165.

The charge-to-voltage conversion section 165 has a configuration of a floating diffusion amplifier. Specifically, the charge-to-voltage conversion section 165 includes a floating diffusion region FD into which signal charges are injected from the CCD register 164; a reset drain RD to discharge charges; and a reset gate RG that discharges detected signal charges to the reset drain RD and initializes (resets) the floating diffusion region FD.

In the charge-to-voltage conversion section 165, when a signal charge is injected into the floating diffusion area FD from the CCD register 164, the potential of the floating diffusion region FD changes according to a charge quantity of the injected signal electric charge. Thereby, the signal charge is converted into a voltage. The charge-to-voltage conversion section 165 makes up an output amplifier (output section) in conjunction with the clamping circuit 166.

Figure 3:
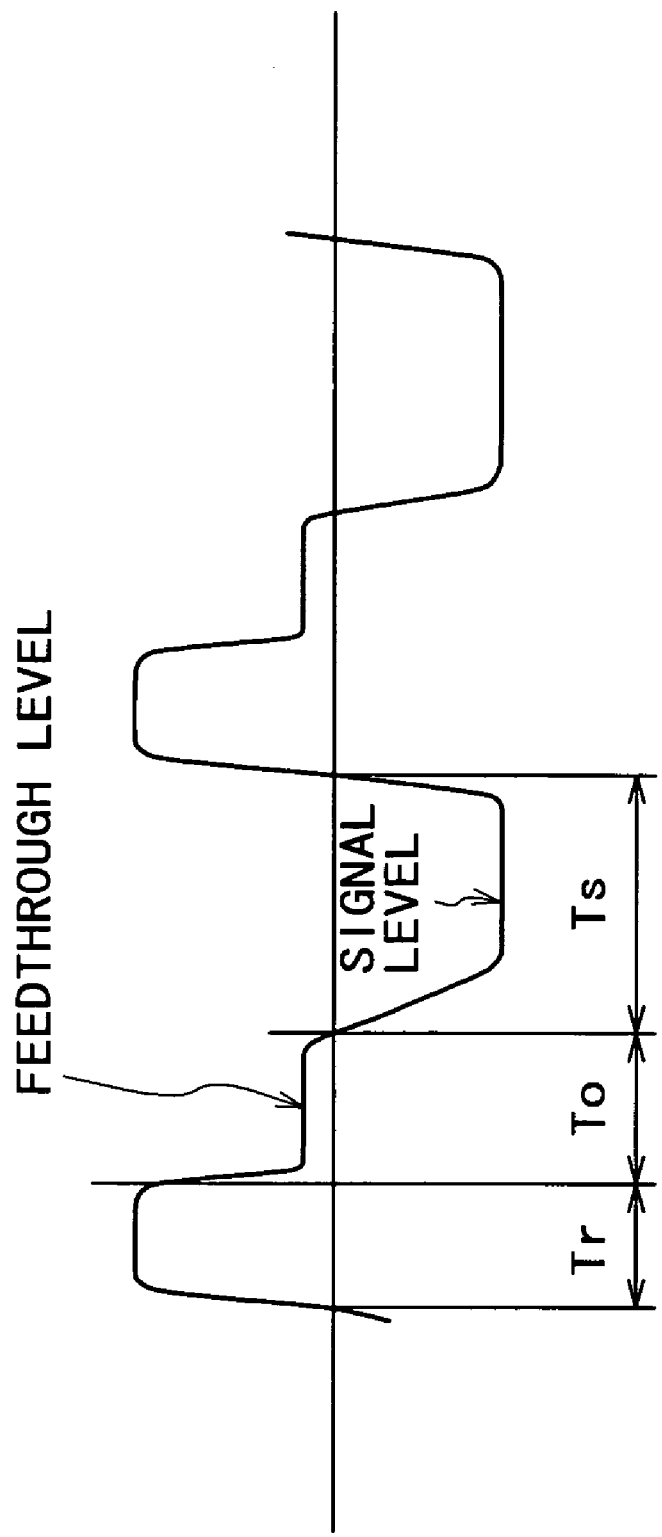
FIG. 3 is a waveform diagram showing an output waveform of a charge-to-voltage conversion section in a CCD sensor.

FIG. 3 is a waveform diagram showing an output waveform of the charge-to-voltage conversion section 165. As is apparent from FIG. 3, the output waveform of the charge-to-voltage conversion section 165 is divided into three periods of reset period Tr, feedthrough level (zero reference) period To, and signal period Ts. The clamping circuit 166 clamps the output voltage waveform to a feedthrough level.

The configuration of the line sensor shown here is only an example, and the CCD sensor 16 is not limited to a line sensor of this configuration. For example, a line sensor having the following configuration may be used. That is, a CCD register is disposed at each end of one pixel array section so that signal charges of odd-numbered pixels are shifted to one CCD register and signal charges of even-numbered pixels are shifted to the other CCD register to horizontally transfer signal charges in parallel by the two CCD registers.

As the CCD sensor 16, if the image reading apparatus supports monochrome images, one line sensor is formed on a semiconductor board (not shown), while if the image reading apparatus supports color images, three line sensors corresponding to the three colors, R (red), G (green), and B (blue) are formed on the semiconductor board at prescribed intervals so that the three light components can be detected. If the image reading apparatus supports monochrome and color images, one line sensor for monochrome images and three line sensors for the R, G, and B colors are formed on the semiconductor board at prescribed intervals.

The CCD sensor 16 is disposed on a board 17A together with a read signal processing section (not shown) including a drive control section such as a CCD driver for driving the CCD sensor 16. An analog video signal outputted from the CCD sensor 16, after being subjected to predetermined signal processing in the read signal processing section, is sent to the image processing section 20 disposed on an image processing board 17B.

The ADF apparatus 30 includes: a document setting section 31; a document discharging section 32; and pairs of various feeding rolls such as a pair of registration rolls 33A and a pair of exit rolls 33B for forming a document feeding path. A guide 18 is provided at a left edge of the drawing in the platen glass 12 above the housing 11. In the immediate neighborhood of the guide 18, a light-permeable contact glass 19 (readout glass) is disposed.

In the image reading apparatus configured as described above, the full rate carriage 13 of the document reading section 10 forming a readout optical system is usually in a home position. During feed reading in which an image of a document is read while the document is fed by the ADF apparatus 30, the full rate carriage 13 is fixed (locked for halt) in an arbitrary position below the contact glass 19, which is on a document feeding path of the ADF apparatus 30.

Specifically, the full rate carriage 13 moves or moves under exposure scanning in the direction opposite to the arrow X from the home position, and is locked for halt in a feed read image tip position. At this time, the CCD sensor 16 and the read signal processing section go into an imaging wait state. Thereafter, an exposure start permission signal is sent from a CPU of a main unit (not shown) to the ADF apparatus 30. Upon receiving the exposure start permission signal, the ADF apparatus 30 starts to feed a document set on the document setting section 31.

When the document is guided toward the guide 18 via the predetermined feeding paths including the various pairs of feeding rolls 33 and the tip of the document reaches the feed read image tip position via the pair of registration rolls 33A, an image tip detection signal is sent from the ADF apparatus 30 to the document reading section 10, when reading of the document image is started. The circumferential speeds of the pairs of feeding rolls 33 such as the pair of registration rolls 33A and the pair of exit rolls 33B are controlled to be constant, whereby the document passes on the contact glass 19 at a substantially constant speed and is discharged to the document discharging section 32 by the pair of exit rolls 33B.

By the abovementioned series of operations, in the image reading apparatus, image reading based on the so-called CVT (Constant Velocity Transfer) method is performed. According to this method, during feed reading, an image of a document to be read is read while the document is fed at a constant speed.

On the other hand, during stationary reading in which an image of a document is read with the document being mounted on the platen glass 12, the document is mounted on the platen glass 12 manually (or by the ADF apparatus 30) and fixed in an arbitrary position on the platen glass 12 so that the readout optical system including the full rate carriage 13 and the half rate carriage 14 is moved for scanning at a constant speed in the direction of the arrow X to read the document image.

Specifically, in the state in which the document mounted on the platen glass 12 is covered with the ADF apparatus 30, light from the light source 131 is applied on the document surface through the platen glass 12 and its reflected light is gathered on the imaging face of the CCD sensor 16 by the lens 15 after passing through the full rate carriage 13 and the half rate carriage 14. The CCD sensor 16 performs photoelectric conversion for the incident light on a pixel basis to read the document image by a prescribed resolution determined by the number of pixels and outputs an analog image signal. If the image reading apparatus supports color images, analog image signals of the R, G, and B color components are outputted from the CCD sensor 16.

During the reading, in order that irradiation light from the light source 131 is applied on the whole surface of the document and the CCD sensor 16 reads the whole input image through the readout optical system including the lens 15, the readout optical system including the full rate carriage 13 including the light source 131, the half rate carriage 14, or the lens 15, and the CCD sensor 16 move at a constant speed in the direction (slow-scanning direction) of the arrow X in FIG. 1.

By the abovementioned series of operations, in the image reading apparatus, during stationary reading, a document to be read is fixed on the platen glass 12, and the readout optical system including the full rate carriage 13 and the half rate carriage 14 is moved at a constant speed to read an image of the document.

Figure 4:
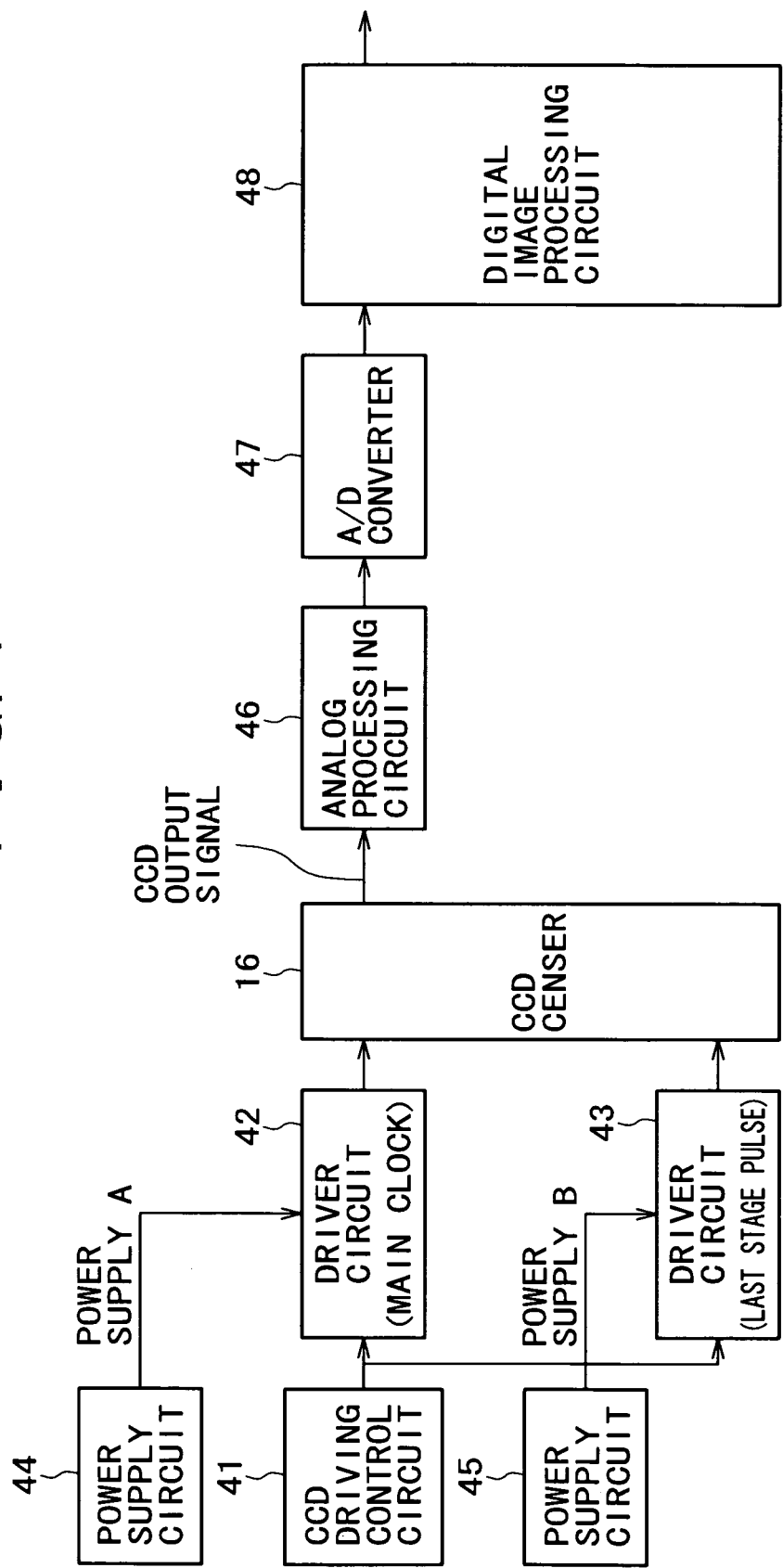
FIG. 4 is a block diagram showing the configurations of a drive system of a CCD sensor and a signal processing system thereof.

FIG. 4 is a block diagram showing the configurations of a drive system of the CCD sensor 16 and a signal processing system thereof.

In FIG. 4, the CCD driving control circuit 41 generates various timing pulses to drive the CCD sensor 16. The various timing pulses include pluses in the CCD sensor (line sensor) 16 shown in FIG. 2, such as a shift pulse φSH to drive the shift gate 163, horizontal transfer clocks φ1 and φ2 of opposite phases to drive the CCD register 164, a last transfer clock φ2B to drive the last transfer stage of the CCD register 164 (the same phase as that of the horizontal transfer clock φ2), a reset gate pulse φRG to drive the reset gate RG of the charge-to-voltage conversion section 165, and a clamp pulse φCP to drive the clamping circuit 166.

The various timing pulses to drive the CCD sensor 16 are divided into plural groups, for instance, two groups. Specifically, one group includes main clocks responsible for transferring and driving signal charges of the CCD sensor 16 (first timing signal), and the other includes last stage pulses (second timing signals) responsible for driving an output amplifier including the charge-to-voltage conversion section 165 and the clamping circuit 166. The main clocks refer to the horizontal transfer clocks φ1 and φ2, and the last stage pulses refer to the last transfer clock φ2B, the reset gate pulse RG, and the clamp pulse φCP. The shift pulse φSH is included in the group of the last stage pulses.

The group of the main clocks, that is, the horizontal transfer clocks φ1 and φ2, are supplied to the driver circuit 42. The group of the last stage pulses, that is, the last transfer clock φ2B, the reset gate pulse φRG, the clamp pulse φCP, and the shift pulse φSH are supplied to the driver circuit 43 disposed aside from the driver circuit 42. The driver circuits 42 and 43 are configured to respectively operate on power supplies A and B of different systems. That is, power supply A is supplied to the driver circuit 42 from the power supply circuit 44, and power supply B different from the power supply A is supplied to the driver circuit 43 from the power supply circuit 45. The respective voltage values of the power supplies A and B may be the same or different.

The driver circuit 42 drives the CCD register 164 of the CCD sensor 16 according to the horizontal transfer clocks φ1 and φ2. The driver circuit 43 drives the shift gate 163 of the CCD sensor 16 according to the shift pulse φSH, drives the last transfer stage of the CCD register 164 according to the last transfer clock φ2B, drives a reset gate of the charge-to-voltage conversion section 165 according to the reset gate pulse φRG, and drives the clamping circuit 166 according to the clamp pulse φCP.

An analog image signal outputted from the CCD sensor 16 is supplied to the analog processing circuit 46. The analog processing circuit 46 finds the difference between a signal level and a feedthrough level (see FIG. 3) with respect to the analog image signal to perform analog processing such as CDS (Correlated Double Sampling) processing for reducing reset noise occurring during resetting of a floating diffusion region FD. The image signal posterior to the analog processing is converted into a digital image signal by an analog-to-digital converter 47 and then subjected to predetermined signal processing in the digital image processing circuit 48.

FIG. 5 shows a timing relationship of shift pulse φSH, horizontal transfer clocks φ1 and φ2/φ2B, reset gate pulse φRG, and clamp pulse φCP. As is apparent from the timing chart, the shift pulse φSH goes into High level in a vertical transfer period in which a signal charge of each pixel 161 of the pixel array section 162 is shifted (transferred) to the CCD register 164, and is supplied to the driver circuit 42. Conversely, the horizontal transfer clocks φ1 and φ2/φ2B, the reset gate pulse φRG, and the clamp pulse φCP are supplied to the driver circuit 43 in dummy pixel period, optical shield pixel period, and effective pixel period. In the vertical transfer period, the supply of them to the driver circuit 43 is halted.

In the drive system of the CCD sensor 16 configured as described above, the drive CCD register 164 must be driven by the horizontal transfer clocks φ1 and φ2 throughout the period in which signal charges shifted from the pixels 161 of the pixel array section 162 are all transferred to the charge-to-voltage conversion section 165. Accordingly, a large load current flows through the driver circuit 42 that handles the horizontal transfer clocks φ1 and φ2. A load current tends to increase as the number of pixels increases to enhance the read resolution of the CCD sensor 16 or the driving of the CCD register 164 is sped up to increase the reading speed of the CCD sensor 16 for the purpose of increasing the productivity of image reading apparatuses.

Yet, as is apparent from the timing chart of FIG. 5, the horizontal transfer clocks φ1 and φ2 are supplied to the CCD register 164 only during the horizontal transfer period in which signal charges are successively transferred by the CCD register 164. The supply of them to the CCD register 164 is halted during the vertical transfer period in which signal charges are vertically transferred from the pixels 161 of the pixel array section 162 to the CCD register 164. The supply and halt of the horizontal transfer clocks φ1 and φ2 for the CCD register 164 is repeated every one-line cycle (one fast-scanning period).

As a result of the supply and halt of the horizontal transfer clocks φ1 and φ2 being thus repeated, a large load current flows through the driver circuit 42 in the horizontal transfer clock φ1 and φ2 during the horizontal scanning period, while few currents flow in the vertical transfer period. As a result, when the vertical transfer period ends and the horizontal transfer starts, a large fluctuation of current consumption occurs in the driver circuit 42. Yet, much time is required from when a load current starts to flow until its flow becomes stable, and current consumption of the driver circuit 42 fluctuates in a period until its flow becomes stable. The fluctuation of current consumption is accompanied by fluctuations of a supply voltage of the driver circuit 42 as shown in FIG. 5.

On the other hand, in the image reading apparatus of the embodiment, power supplies A and B of different systems are employed as power supplies for the driver circuit 42 that handles the horizontal transfer clocks φ1 and φ2 as first timing signals, and the driver circuit 43 that handles the shift pulse φSH, last transfer clock φ2B, reset gate pulse φRG, and clamp pulse φCP as second timing signals. By this construction, fluctuations of a supply voltage of the driver circuit 42 would not affect a supply voltage of the driver circuit 43, and as is apparent from FIG. 5, the supply voltage of the driver circuit 43 is kept substantially constant. Accordingly, voltage amplitudes and the like of the shift pulse φSH, last transfer clock φ2B, reset gate pulse φRG, and clamp pulse φCP would not fluctuate.

As a result, without being influenced by possible fluctuations of the supply voltage of the driver circuit 42, the last transfer clock φ2B, reset gate pulse φRG, and clamp pulse φCP having stable voltage amplitudes and the like ensure transfer driving of signal charges in the last transfer stage of the CCD register 164, initialization (reset) of a floating diffusion region FD in the charge-to-voltage conversion section 165, and clamping operation in the clamping circuit 166. Therefore, output signals (analog image signals) of stable level can be derived from the CCD sensor 16.

The last transfer clock φ2B, reset gate pulse φRG, and clamp pulse φCP are not affected by fluctuations of a supply voltage caused by fluctuations of load currents attributed to the horizontal transfer clocks φ1 and φ2.

The last transfer clock φ2B, reset gate pulse φRG, and clamp pulse φCP exert a direct influence on output signal levels of the CCD sensor 16. The horizontal transfer clocks φ1 and φ2 are included in a different group (system) from the group of these pulse signals, and the image reading apparatus is configured to include the separate driver circuits 42 and 43 for driving. By this construction, since the stability of the power supply A of the driver circuit 42 for the horizontal transfer clocks φ1 and φ2 need not be increased extremely, the capacity of a power bypass condenser (bypass condenser/decoupling condenser connected between a power line and a reference potential point (e.g., ground)) for the driver circuit 42 can be set to be minimum.

In the abovementioned embodiment, the second timing signals such as the shift pulse φSH, last transfer clock φ2B, reset gate pulse φRG, and clamp pulse φCP are handled in the driver circuit 43 having a power supply system different from that of the driver circuit 42. However, since the reset gate pulse φRG and the clamp pulse φCP are generally considered to exert a great influence on output signal levels of the CCD sensor 16, only the reset gate pulse φRG or only the reset gate pulse φRG and the clamp pulse φCP may be handled in the driver circuit 43 having a power supply system different from that of the driver circuit 42.

In the abovementioned embodiment, as a solid-state image sensor, a line sensor (linear sensor) in which a large number of pixels are linearly disposed is used. However, an area sensor in which a large number of pixels are disposed in a matrix form may also be used.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-000989 filed on Jan. 6, 2004 including specification, claims, drawings and abstract is incorporated herein by reference in its entirety.

What is claimed is:

1. An image reading apparatus comprising:
a solid-state image sensor including a pixel array section in which pixels each including a photoelectric transducer are arrayed, a charge transfer register that transfers a signal charge transferred from each of the pixels of the pixel array section, and an output section that converts the signal charge transferred by the charge transfer register into an electrical signal and outputs the electrical signal;
a driving unit that comprises a first driver circuit that drives the charge transfer register according to a first timing signal, and a second driver circuit that drives the output section according to a second timing signal; and
a power supplying unit that supplies power from a first power system to the first driver circuit and supplied power from a second power system to a second driver circuit.

2. The image reading apparatus according to claim 1, wherein the first timing signal is stopped from being supplied to the driving unit during a period in which the signal charge is transferred from each of the pixels of the pixel array section to the charge transfer register.

3. The image reading apparatus according to claim 1, wherein the output section includes a charge-to-voltage conversion section that converts the signal charge transferred by the charge transport register into a voltage, and the second timing signal includes a reset signal to initialize the charge-to-voltage conversion section.

4. The image reading apparatus according to claim 3, wherein the output section includes a clamping circuit that clamps an output waveform of the charge-to-voltage conversion section to a zero reference level, and the second timing signal includes a clamp signal to drive the clamping circuit.

5. The image reading apparatus according to claim 3,
wherein the second timing signal includes a clock signal to drive a last transfer stage of the charge transfer register.

6. The image reading apparatus according to claim 3,
wherein the second timing signal includes a pulse signal to trigger transfer of the signal charge from each of the pixels of the pixel array section to the charge transfer register.

7. The image reading apparatus according to claim 1, wherein the first and second power systems independently generate power.

8. An image reading apparatus comprising:
a solid-state image sensor including a pixel array section in which pixels each including a photoelectric transducer are arrayed, a charge transfer register for transferring a signal charge transferred from each of the pixels of the pixel array section, and an output means for converting the signal charge transferred by the charge transfer register into an electrical signal and outputting the electrical signal;
a first driving means for driving the charge transfer register according to a first timing signal;
a second driving means for driving the output means according to a second timing signal; and
a power supplying means for supplying power from a first power systems to the first driving means and from a second power system to the second driving means.

9. The image reading apparatus according to claim 8,
wherein the first timing signal is stopped from being supplied to the first driving means during a period in which the signal charge is transferred from each of the pixels of the pixel array section to the charge transfer register.

10. The image reading apparatus according to claim 8,
wherein the output means includes a charge-to-voltage conversion means for converting the signal charge transferred by the charge transport register into a voltage, and
the second timing signal includes a reset signal to initialize the charge-to-voltage conversion means.

11. The image reading apparatus according to claim 10,
wherein the output means includes a clamping circuit for clamping an output waveform of the charge-to-voltage conversion means to a zero reference level, and
the second timing signal includes a clamp signal to drive the clamping circuit.

12. The image reading apparatus according to claim 10,
wherein the second timing signal includes a clock signal to drive a last transfer stage of the charge transfer register.

13. The image reading apparatus according to claim 10,
wherein the second timing signal includes a pulse signal to trigger transfer of the signal charge from each of the pixels of the pixel array section to the charge transfer register.

14. The image reading apparatus according to claim 8,
wherein the first and second power systems independently generate power.

* * * * *